United States Patent
Kim et al.

(10) Patent No.: US 11,705,279 B2
(45) Date of Patent: *Jul. 18, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Je Jung Kim, Suwon-si (KR); Do Young Jeong, Suwon-si (KR); Eun Hee Jeong, Suwon-si (KR); Min Hyang Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,087

(22) Filed: Jan. 12, 2022

(65) Prior Publication Data

US 2022/0139627 A1 May 5, 2022

Related U.S. Application Data

(63) Continuation of application No. 16/742,659, filed on Jan. 14, 2020, now Pat. No. 11,257,621.

(30) Foreign Application Priority Data

Jun. 26, 2019 (KR) .................. 10-2019-0076143

(51) Int. Cl.
*H01G 4/232* (2006.01)
*H01G 4/30* (2006.01)
(Continued)

(52) U.S. Cl.
CPC ........... *H01G 4/2325* (2013.01); *H01G 4/012* (2013.01); *H01G 4/248* (2013.01); *H01G 4/30* (2013.01); *H01G 4/1227* (2013.01)

(58) Field of Classification Search
CPC ...... H01G 4/2325; H01G 4/012; H01G 4/248; H01G 4/30; H01G 4/005; H01G 4/1227
(Continued)

(56) References Cited

U.S. PATENT DOCUMENTS 5,170,317 A 12/1992 Yamada et al.
9,082,556 B2 7/2015 Fukunaga et al.
(Continued)

FOREIGN PATENT DOCUMENTS

CN 102652342 A 8/2012
CN 105895368 A 8/2016
(Continued)

OTHER PUBLICATIONS

Chinese Office Action dated Aug. 11, 2022, issued in corresponding Chinese Patent Application No. 202010247953.3 (with English translation).
(Continued)

*Primary Examiner* — Arun Ramaswamy
(74) *Attorney, Agent, or Firm* — Morgan, Lewis & Bockius LLP

(57) ABSTRACT

A multilayer ceramic electronic component includes a ceramic body including pluralities of first and second internal electrodes alternately disposed to face each other with respective dielectric layers interposed therebetween. First and second external electrodes are disposed on external surfaces of the ceramic body and are respectively electrically connected to the first and second external electrodes. A first dummy electrode is disposed in a margin portion of the ceramic body adjacent the first internal electrode in a third (Continued)

direction, and a second dummy electrode is disposed in a margin portion of the ceramic body adjacent the second internal electrode in the third direction. A distance (Ld) between the first and second dummy electrodes in a second direction, and a length (Lm) of each margin portion between one of the first and second internal electrodes and an external surface of the ceramic body in the second direction, satisfy Ld≤Lm.

12 Claims, 6 Drawing Sheets

(51) Int. Cl.
*H01G 4/248* (2006.01)
*H01G 4/12* (2006.01)
*H01G 4/012* (2006.01)

(58) Field of Classification Search
USPC ... 361/129, 301.4, 303, 306.3, 321.1, 321.2, 361/321.3
See application file for complete search history.

(56) References Cited

U.S. PATENT DOCUMENTS

| | | | |
|---|---|---|---|
| 9,214,283 B2 | 12/2015 | Togashi | |
| 9,406,443 B2 | 8/2016 | Katsuta | |
| 2007/0133147 A1 | 6/2007 | Ritter et al. | |
| 2009/0154055 A1* | 6/2009 | Takashima | H01G 4/30 361/301.4 |
| 2009/0316330 A1* | 12/2009 | Taniguchi | H01G 4/30 361/306.3 |
| 2011/0007449 A1 | 1/2011 | Seo et al. | |
| 2012/0134068 A1* | 5/2012 | Chae | H01G 4/012 361/321.2 |
| 2012/0250217 A1 | 10/2012 | Fukunaga et al. | |
| 2012/0314338 A1 | 12/2012 | Togashi | |
| 2014/0240895 A1 | 8/2014 | Lee et al. | |
| 2015/0255213 A1 | 9/2015 | Lee et al. | |
| 2016/0020028 A1 | 1/2016 | Katsuta | |
| 2016/0099105 A1 | 4/2016 | Lee et al. | |
| 2016/0240314 A1 | 8/2016 | Fujii | |
| 2016/0240317 A1 | 8/2016 | Ro et al. | |
| 2017/0243695 A1 | 8/2017 | Kim et al. | |
| 2017/0345571 A1 | 11/2017 | Imaeda et al. | |
| 2019/0096584 A1* | 3/2019 | Hong | H01G 4/30 |
| 2019/0279819 A1* | 9/2019 | Horn | H01G 4/255 |

FOREIGN PATENT DOCUMENTS

| | | |
|---|---|---|
| CN | 107103996 A | 8/2017 |
| JP | 2005-235976 A | 9/2005 |
| JP | 2011-18874 A | 1/2011 |
| JP | 2011-151224 A | 8/2011 |
| JP | 2013-004569 A | 1/2013 |
| JP | 2015-109411 A | 6/2015 |
| JP | 2015-170849 A | 9/2015 |
| JP | 2017-212276 A | 11/2017 |
| KR | 10-2014-0106021 A | 9/2014 |
| KR | 10-2015-0096909 A | 8/2015 |

OTHER PUBLICATIONS

Korean Office Action dated Apr. 17, 2023, issued in corresponding Korean Patent Application No. 10-2019-0076143.

* cited by examiner

MULTILAYER CERAMIC ELECTRONIC COMPONENT

CROSS-REFERENCE TO RELATED APPLICATION(S)

This application is a continuation application of U.S. patent application Ser. No. 16/742,659 filed on Jan. 14, 2020, which claims priority to Korean Patent Application No. 10-2019-0076143 filed on Jun. 26, 2019 in the Korean Intellectual Property Office, the disclosures of which are incorporated herein by reference in their entirety.

BACKGROUND

1. Field

The present disclosure relates to a multilayer ceramic electronic component, more specifically to a multilayer ceramic electronic component having excellent reliability.

2. Description of Related Art

As electronic products are miniaturized, made slimmer, and multi-functionalized, the chip components therein correspondingly need to be miniaturized, including multilayer ceramic capacitors. Such multilayer ceramic capacitors are also becoming highly integrated in terms of the mounting thereof.

Multilayer ceramic capacitors are a type of electronic component that is commonly mounted on the printed circuit boards of electronic imaging devices such as liquid crystal displays (LCD), plasma display panels (PDP), and the like, and various electronic components such as computers, personal digital assistants (PDA), cellular phones, and the like, to charge or discharge electricity.

Due to the advantages of being miniaturized and easily mounted while having high capacity, the multilayer ceramic capacitors can be used as various electronic device components.

Meanwhile, as industrial interest in electronic components has recently increased, there is a need for multilayer ceramic capacitors to have high reliability and high strength so that such multilayer ceramic capacitors can be used in automobile or infotainment systems.

In particular, as the multilayer ceramic capacitors are expected to have flexural strength and moisture-resistance characteristics, it is important to improve internal and external structures, and the like, for improving moisture-resistance and flexural strength.

CITATION LIST

Patent Literature (Patent Literature 1) Japanese Patent Laid-open Publication No. 2011-018874

SUMMARY

An aspect of the present disclosure is to provide a multilayer ceramic electronic component, and more specifically, to provide a multilayer ceramic electronic component having excellent reliability.

According to an aspect of the present disclosure, a multilayer ceramic electronic component includes a ceramic body comprising a plurality of first internal electrodes and a plurality of second internal electrodes alternately disposed to face each other with respective dielectric layers interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction. A first external electrode and a second external electrode are disposed on external surfaces of the ceramic body while being electrically connected to the first and second external electrodes respectively. A first dummy electrode is disposed in a margin portion of the ceramic body adjacent the first internal electrode in the third direction, and a second dummy electrode is disposed in a margin portion of the ceramic body adjacent the second internal electrode in the third direction. A distance (Ld) between the first and second dummy electrodes in the second direction, and a length (Lm) of each margin portion between one of the first and second internal electrodes and an external surface of the ceramic body in the second direction, satisfy Ld≤Lm.

According to another aspect of the present disclosure, a multilayer ceramic electronic component includes a ceramic body comprising a plurality of first internal electrodes and a plurality of second internal electrodes alternately disposed to face each other with respective dielectric layers interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction. A first external electrode and a second external electrode are disposed on external surfaces of the ceramic body, where the first and second external electrodes are electrically connected to the first and second external electrodes respectively. A first dummy electrode is disposed in a margin portion of the ceramic body adjacent the first internal electrode in the third direction, and a second dummy electrode is disposed in a margin portion of the ceramic body adjacent the second internal electrode in the third direction. The first and second external electrodes respectively include a first electrode layer and a second electrode layer respectively electrically connected to the first and second internal electrodes, and a first conductive resin layer and a second conductive resin layer respectively disposed on the first and second electrode layers, where the first and second electrode layers and the first and second conductive resin layers extend to the fifth and sixth surfaces of the ceramic body. A length (L2) in the second direction of the first and second dummy electrodes disposed internally within the ceramic body is longer than a length (L1) of the first and second electrode layers extending onto the first and second surfaces in the second direction.

According to a further aspect of the present disclosure, a multilayer ceramic electronic component includes a ceramic body comprising a plurality of first internal electrodes and a plurality of second internal electrodes alternately disposed to face each other with respective dielectric layers interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction. A first external electrode and a second external electrode are disposed on external surfaces of the ceramic body while being electrically connected to the first and second external electrodes respectively. A first dummy electrode is disposed in a margin portion of the ceramic body adjacent the first internal electrode in the third direction, and a second dummy electrode is disposed in a margin portion of the ceramic body adjacent the second internal electrode in the third direction. Widths of the first and second dummy electrodes satisfy 20% to 60% of widths of the margin portions of the first and second internal electrodes in the third direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
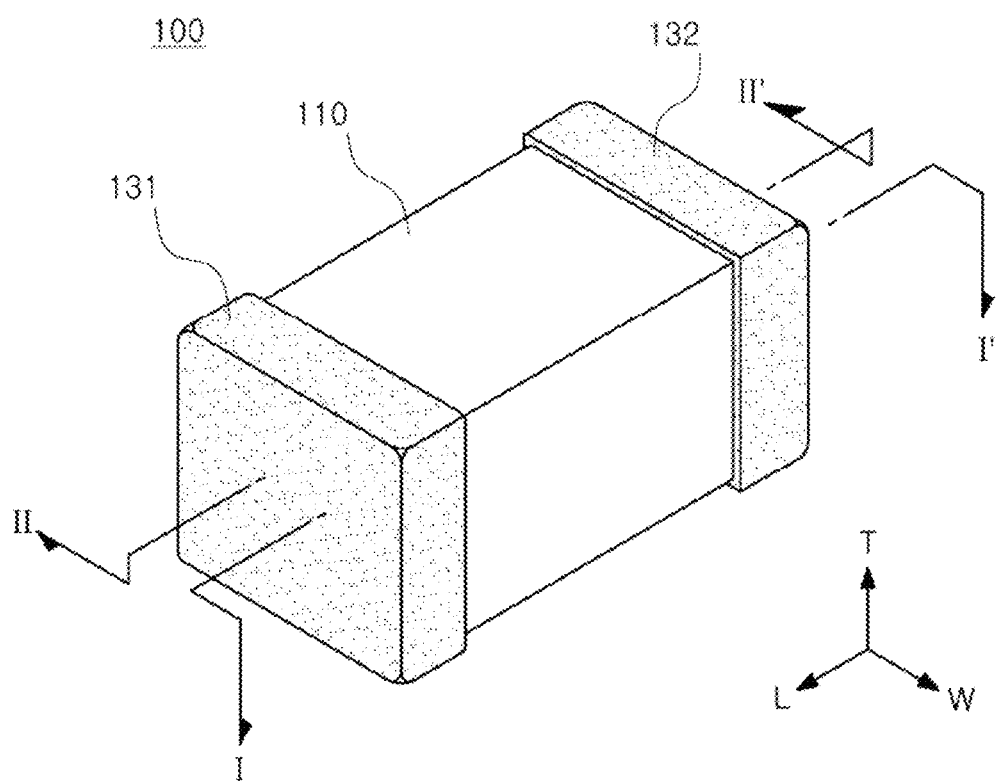
FIG. 1 is a schematic perspective view of a multilayer ceramic capacitor according to an embodiment in the present disclosure.

The invention may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements.

In the specification, unless otherwise specifically indicated, when a certain part "includes" a certain component, it is understood that other components may be further included but are not excluded.

In the drawings, anything unnecessary for describing the present disclosure will be omitted for clarity, and thicknesses are enlarged for the purpose of clearly illustrating layers and areas. Like reference numerals in the drawings denote like elements, and thus their descriptions will be omitted.

Hereinafter, preferred embodiments of the present disclosure will be described as follows with reference to the attached drawings.

FIG. 1 is a schematic perspective view of a multilayer ceramic capacitor according to an embodiment in the present disclosure.

Figure 2:
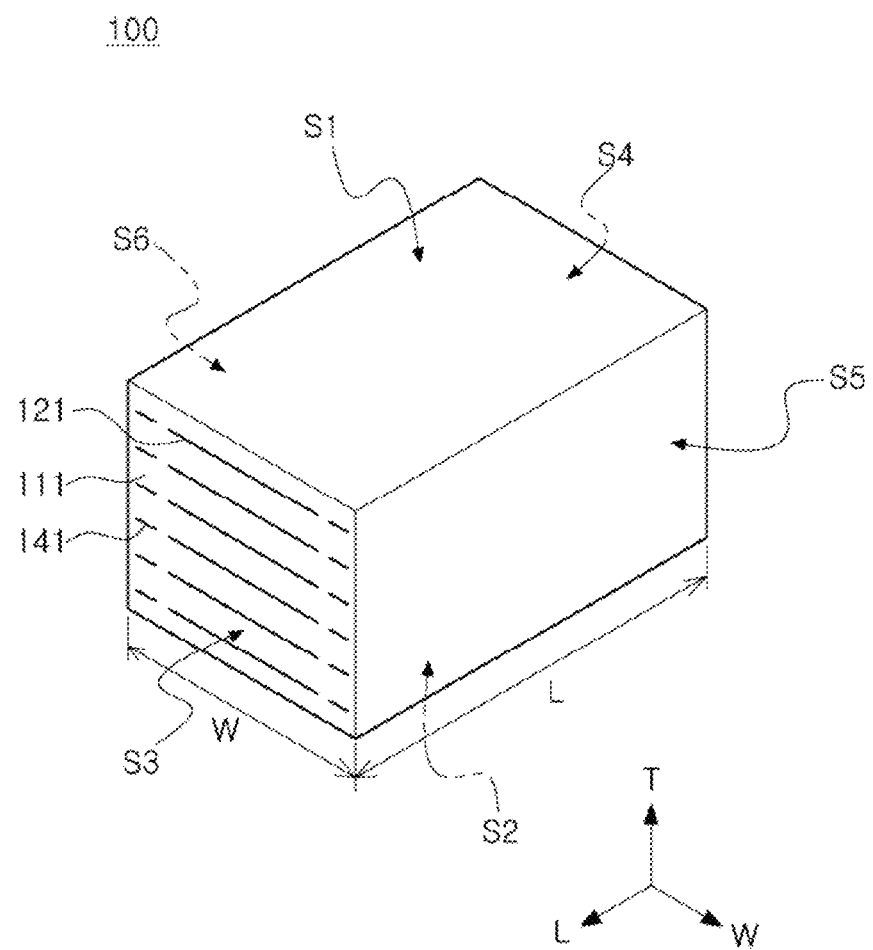
FIG. 2 is a schematic diagram of a ceramic body according to an embodiment.

FIG. 2 is a schematic diagram of a ceramic body according to an embodiment.

Figure 3:
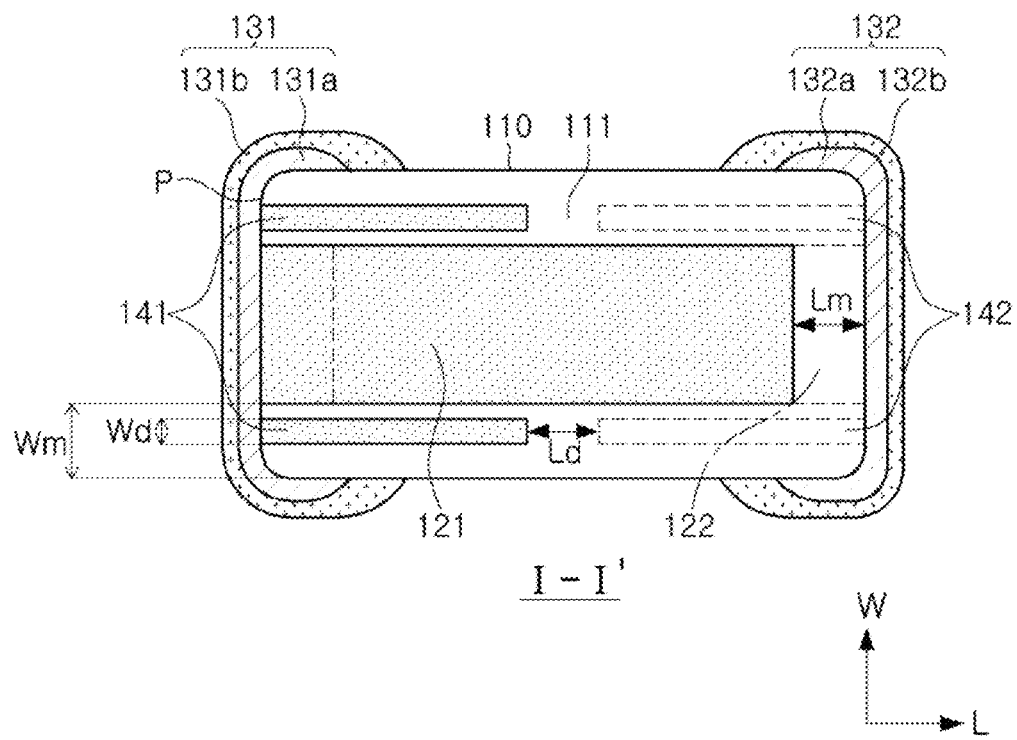
FIG. 3 is a cross-sectional view taken along line I-I' of FIG. 1 according to Embodiment Example 1.

FIG. 3 is a cross-sectional view taken along line I-I' of the multilayer ceramic capacitor of FIG. 1.

Referring to FIGS. 1 to 3, a multilayer ceramic electronic component 100 according to an embodiment includes a ceramic body 110 comprising dielectric layers 111 and a plurality of first and second internal electrodes 121 and 122 disposed to face each other with respective dielectric layers 111 interposed therebetween, and a first surface S1 and a second surface S2 opposing each other in a first direction, a third surface S3 and a fourth surface S4 connected to the first surface S1 and the second surface S2 and opposing each other in a second direction, and a fifth surface S5 and a sixth surface S6 connected to the first to fourth surfaces and opposing each other in a third direction. External electrodes 131 and 132 are disposed on external surfaces of the ceramic body and electrically connected to the plurality of internal electrodes 121 and 122, respectively.

Hereinbelow, a multilayer ceramic electronic component will be described according to an embodiment, particularly as a multilayer ceramic capacitor, but is not limited thereto.

With regard to the multilayer ceramic capacitor 100 according to an embodiment, the "length direction," "width direction," and "thickness direction" are defined as an "L" direction, a "W" direction, and a "T" direction, respectively. The "thickness direction" may be used in the same sense as a direction in which the dielectric layers are stacked up, for example, a "lamination direction."

In an embodiment, the ceramic body 110 is not particularly limited in terms of configuration, but may be a rectangular cuboid shape as illustrated in the drawing.

The ceramic body 110 may include a first surface S1 and a second surface S2 opposing each other in a first direction, a third surface S3 and a fourth surface S4 connected to the first surface S1 and the second surface S2 and opposing each other in a second direction, and a fifth surface S5 and a sixth surface S6 connected to the first to fourth surfaces and opposing each other in a third direction.

The first surface S1 and the second surface S2 are surfaces opposing each other in the first direction, e.g. the thickness direction of the ceramic body 110. The third surface S3 and the fourth surface S4 may be defined as surfaces opposing each other in the second direction, e.g. the length direction, while the fifth surface S5 and the sixth surface S6 may be defined as surfaces opposing each other in the third direction, e.g. the width direction.

Ends of the plurality of first internal electrodes 121 formed in the ceramic body 110 are exposed to the third surface S3, and ends of the plurality of second internal electrodes 122 formed in the ceramic body 110 are exposed to the fourth surface S4 of the ceramic body.

The internal electrodes 121 and 122 may include the first internal electrode 121 and the second internal electrode 122 having different polarities in pairs.

One end portion of the first internal electrode 121 may be exposed to the third surface S3, while one end portion of the second internal electrode 122 may be exposed to the fourth surface S4.

The other end portions of the first internal electrode 121 and the second internal electrode 122 are disposed a certain distance from the fourth surface S4 or the third surface S3, respectively. This will be described in more detail below.

The first and second external electrodes 131 and 132 are formed on the third surface S3 and the fourth surface S4 of the ceramic body, respectively, to be electrically connected to the first and second internal electrodes, respectively.

According to an embodiment, the plurality of the first and second internal electrodes 121 and 122 may be stacked in a direction perpendicular to a mounting surface of a substrate.

In an embodiment, when the plurality of first and second internal electrodes 121 and 122 included in the multilayer ceramic capacitor are stacked in the direction perpendicular to the substrate mounting surface, the flexural strength becomes weak. In order to solve this problem, the ceramic body further includes first and second dummy electrodes 141 and 142.

Accordingly, in an embodiment, the substrate mounting surface may be the fifth surface S5 or the sixth surface S6 among the six surfaces of the ceramic body.

According to an embodiment, a raw material forming the dielectric layers 111 is not particularly limited as long as sufficient capacitance may be obtained therefrom, and for example, may be a barium titanate material, a lead composite perovskite material, a strontium titanate material, or the like.

As for a material forming the dielectric layers 111, various ceramic additives, organic solvents, plasticizers, binders, dispersants, or the like, can be added to a powder of barium titanate, or the like, according to the purpose of the present disclosure.

A material forming the first and second internal electrodes 121 and 122 is not particularly limited, but, for example, may be a conductive paste including at least one of silver (Ag), lead (Pb), platinum (Pt), nickel (Ni), and copper (Cu).

A multilayer ceramic capacitor according to an embodiment may include a first external electrode 131 electrically connected to the first internal electrode(s) 121 and a second external electrode 132 electrically connected to the second internal electrode(s) 122.

The first and second external electrodes 131 and 132 may be electrically connected to the first and second internal electrodes 121 and 122, respectively, to generate capacitance. The second external electrode 132 may be connected to an electric potential different from that of the first external electrode 131.

The first and second external electrodes 131 and 132 are respectively disposed on the third surface S3 and the fourth surface S4 in the length direction, e.g. the second direction, but may extend to the first surface S1 and the second surface S2 in the thickness direction, e.g. the first direction.

While being disposed on external surfaces of the ceramic body 110, the external electrodes 131 and 132 may include first and second electrode layers 131a and 132a electrically connected to the internal electrodes 121 and 122, respectively, and first and second conductive resin layers 131b and 132b respectively disposed on the first and second electrode layers 131a and 132a.

Specifically, while being disposed on the third surface S3 in the length direction, e.g. the second direction, the first electrode 131 may include a first electrode layer 131a electrically connected to the first internal electrode(s) 121 and a first conductive resin layer 131b disposed on the first electrode layer 131a.

Further, while being disposed on the fourth surface S4 in the length direction, e.g. the second direction, the second electrode 132 may include a second electrode layer 132a electrically connected to the second internal electrode(s) 122 and a second conductive resin layer 132b disposed on the second electrode layer 132a.

The first and second electrode layers 131a and 132a may include a conductive metal and glass.

The conductive metal used for the first and second electrode layers 131a and 132a is not particularly limited as long as the metal can be electrically connected to the internal electrodes to generate capacitance, and for example, may be at least one selected from the group consisting of Cu, Ag, Ni, and alloys thereof.

The first and second electrode layers 131a and 132a may be formed by applying a conductive paste prepared by adding glass frit to conductive metal powder and firing the conductive paste.

The first and second conductive resin layers 131b and 132b are respectively formed on the first and second electrode layers 131a and 132a and may be formed to fully cover the first and second electrode layers 131a and 132a.

A base resin included in the first and second conductive resin layers 131b and 132b is not particularly limited as long as it has bondability and impact absorption and can be mixed with conductive metal powder to prepare a paste, and for example, may an epoxy resin.

The conductive metal included in the first and second conductive resin layers 131b and 132b is not particularly limited as long as the metal is a material which can be electrically connected to the internal electrode layers 131a and 132b to generate conductance, and for example, may include at least one selected from the group consisting of Cu, Ag, Ni and alloys thereof.

The first and second electrode layers 131a and 132a and the first and second conductive resin layers 131b and 132b extend to the first surface S1 and the second surface S2 of the ceramic body 110.

Referring to FIG. 3, the multilayer ceramic electronic component 100 according to Embodiment Example 1 includes a first dummy electrode 141 disposed in a margin portion adjacent the first internal electrode 121 in the third direction and a second dummy electrode 142 disposed in a margin portion adjacent the second internal electrode 122 in the third direction of the ceramic body (e.g., a width direction), and a distance (Ld) between the first and second dummy electrodes 141 and 142 and a length (Lm) of each margin portion of the first and second internal electrodes in the second direction (e.g., a length direction) of the ceramic body 110 satisfy Ld≤Lm.

As previously described, the third direction and the second direction of the ceramic body 110 are the width direction and the length direction, respectively.

In addition, in terms of the third direction of the ceramic body 110, the margin portions of the first internal electrode 121 and the second internal electrode 122 in the third direction refer to margin portions adjacent to the internal electrodes in the width direction.

In terms of the second direction of the ceramic body 110, the distance (Ld) between the first dummy electrode 141 and the second dummy electrode 142 refers to the distance in the second direction by which the first dummy electrode 141 and the second dummy electrode 142 are spaced apart as they each extend from a respective side surface of the ceramic body 110 (e.g., one of surfaces S3 and S4) towards the interior of the ceramic body.

In other words, the first dummy electrode 141 may be exposed to the third surface S3 of the ceramic body 110 similarly to the configuration of the first internal electrode 121, and also may be spaced apart from the fourth surface S4 by a certain distance.

Similarly, the second dummy electrode 142 may be exposed to the fourth surface S4 of the ceramic body 110 similarly to the configuration of the second internal electrode 122, and also may be spaced apart from the third surface S3 by a certain distance.

In terms of the second direction of the ceramic body 110, a length (Lm) of the margin portion of each of the first and second internal electrodes 121 and 122 in the second direction refers to a certain distance by which the first and second internal electrodes 121 and 122 are each spaced apart from a respective one of the fourth surface S4 and the third surface S3.

In other words, each margin portion of the first and second internal electrodes 121 and 122 in the second direction refers to a region by which the first and the second internal electrodes 121 and 122 are each spaced apart from a respective one of the fourth surface S4 and the third surface S3 by a certain distance, and can be defined as a length direction-margin portion of the ceramic body.

According to Embodiment Example 1, flexural strength of the multilayer ceramic capacitor can be improved by adjusting the distance (Ld) between the first dummy electrode 141 and the second dummy electrode 142 and the length (Lm) of each margin portion of the first and second internal electrodes 121 and 122 in the second direction of the ceramic body 110 to satisfy Ld≤Lm.

In particular, when the distance (Ld) between the first dummy electrode 141 and the second dummy electrode 142 and the length (Lm) of each margin portion of the first and second internal electrodes 121 and 122 in the second direction of the ceramic body 110 satisfy Ld≤Lm, the flexural strength significantly increases as surfaces of the first dummy electrode 141 and the second dummy electrode 142 are increased in size.

In contrast, when the distance (Ld) between the first dummy electrode 141 and the second dummy electrode 142 is longer than the length (Lm) of each margin portion of the first and second internal electrodes 121 and 122 in the second direction of the ceramic body 110, an increase in the flexural strength may not be as significant as that of Embodiment Example 1.

According to an embodiment, the first dummy electrode 141 and the second dummy electrode 142 may be arranged internally from an inflection point (P) of a corner portion of the ceramic body 110 in the first direction of the ceramic body 110, i.e., between the inflection point (P) and a center of the ceramic body 110 along the third direction.

The inflection point (P) in the first direction of the ceramic body 110, in which both end portions in the first direction have a straight portion and a corner portion, is a point at which the straight portion becomes the curved portion, that is, where the straight portion meets the curved portion.

Being disposed adjacent the corner portion of the ceramic body 110, the first dummy electrode 141 and the second dummy electrode 142 are arranged internally from the inflection point (P) and thus may have excellent moisture-resistance reliability.

That is, in terms of the corner portion of the ceramic body 110, when the first dummy electrode 141 and the second dummy electrode 142 are arranged outwardly from the inflection point in the first direction, i.e., arranged in the curved portion, stray capacitance, or the like, may be generated and moisture-resistance reliability may be reduced by outdoor air.

As illustrated in FIG. 3, according to an embodiment, the widths (Wd) of the first dummy electrode 141 and the second dummy electrode 142 in the third direction of the ceramic body 110 may satisfy 20% to 60% of the widths (Wm) of the margin portions of the first and second internal electrodes 121 and 122.

The widths (Wd) of the first dummy electrode 141 and the second dummy electrode 142 mean those of the first dummy electrode 141 and the second dummy electrode 142 in the third direction of the ceramic body 110.

The margin portions of the first internal electrode 121 and the second internal electrode 122 in the third direction of the ceramic body 110 mean a region by which the first internal electrode and the second internal electrode 122 are spaced apart respectively from the fifth surface S5 and the sixth surface S6 of the ceramic body by a certain distance, and can be defined as a width direction-margin portion of the ceramic body 110.

The flexural strength and moisture-resistance reliability of the multilayer ceramic capacitor can be simultaneously improved by adjusting the widths (Wd) of the first dummy electrode 141 and the second dummy electrode 142 in the third direction of the ceramic body 110 to satisfy 20% to 60% of the widths (Wm) of the margin portions of the first internal electrode 121 and the second internal electrode 122 in the third direction.

When the widths (Wd) of the first dummy electrode 141 and the second dummy electrode 142 are less than 20% of the widths (Wm) of the margin portions of the first and second internal electrodes 121 and 122 in the third direction of the ceramic body 110, the widths (Wd) of the first dummy electrode 141 and the second dummy electrode 142 are too narrow, thereby giving rise to insignificant improvement of flexural strength.

Meanwhile, when the widths (Wd) of the first dummy electrode 141 and the second dummy electrode 142 are greater than 60% of the widths (Wm) of the margin portions of the first and second internal electrodes 121 and 122 in the third direction of the ceramic body 110, stray capacitance, or the like, may be generated and moisture-resistance reliability may be reduced by outdoor air.

According to an embodiment, the first and second dummy electrodes 141 and 142 may be disposed on different dielectric layers 111.

By being disposed on different dielectric layers 111, short defects and stay capacitance are less likely to be generated, thereby increasing the reliability of the first and second dummy electrodes 141 and 142.

Figure 4:
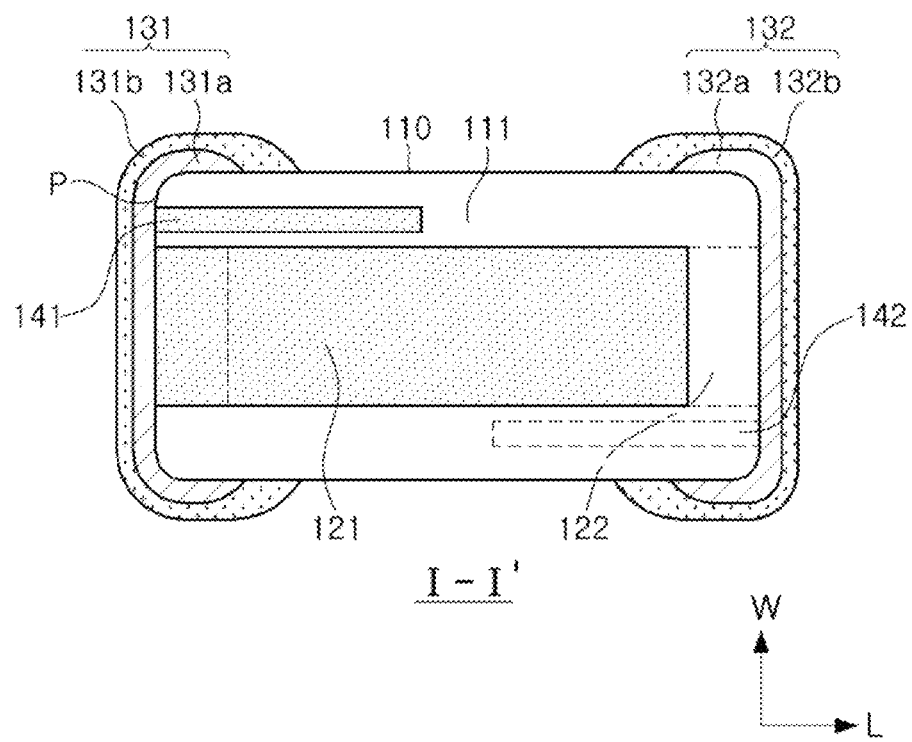
FIG. 4 is a cross-sectional view taken along line I-I' of FIG. 1 according to Embodiment Example 2.

FIG. 4 is a cross-sectional view taken along line I-I' of FIG. 1 according to Embodiment Example 2.

Referring to FIG. 4, the first dummy electrode 141 in Embodiment Example 2 may be disposed in one region of the margin portion of the first internal electrode 121 in the third direction of the ceramic body 110, and the second dummy electrode 142 may be disposed in one region of the margin portion of the second internal electrode 122 in the third direction of the ceramic body 110.

When the first and second dummy electrodes 141 and 142 are each disposed in only one region of the margin portion of the first and second internal electrodes 121 and 122, and the first and second dummy electrodes 141 and 142 are disposed regions of the margin portion of the first and second internal electrodes 121 and 122 on opposing sides along the third direction, the first and second dummy electrodes 141 and 142 may be disposed diagonally across from each other (e.g., on opposite sides of a diagonal of the ceramic body 110 on a cross-section in the length-width (LW) direction of the ceramic body 110).

By being disposed diagonally across from each other, not only flexural strength is increased but also short defects and stay capacitance are less likely to be generated as the first and second dummy electrodes 141 and 142 can be disposed farthest from each other, thereby increasing the reliability thereof.

Figure 5:
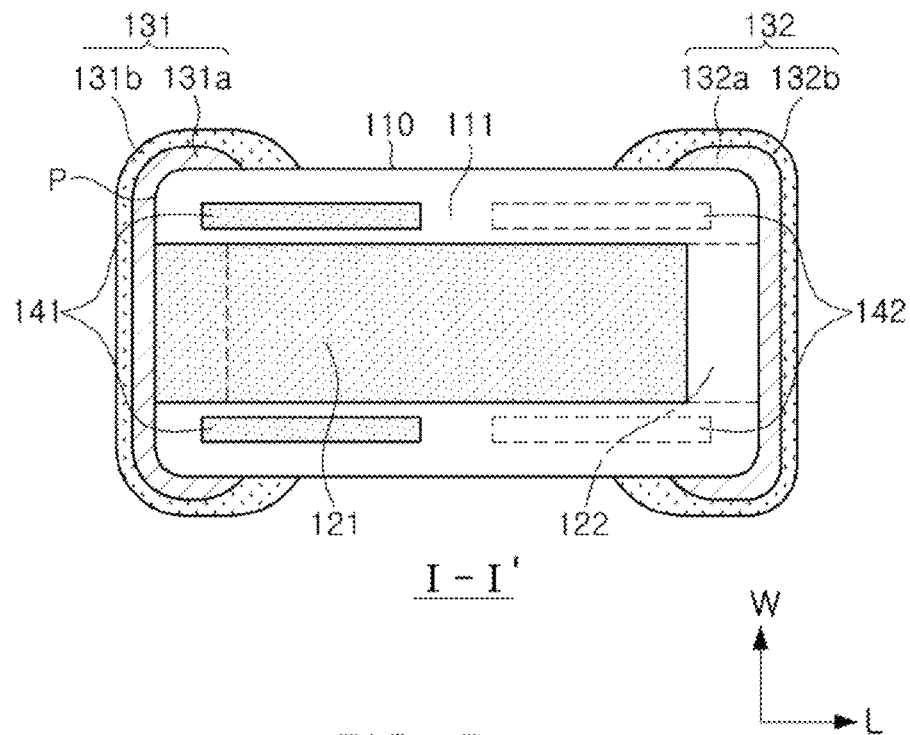
FIG. 5 is a cross-sectional view taken along line I-I' of FIG. 1 according to Embodiment Example 3.

FIG. 5 is a cross-sectional view taken along line I-I' of FIG. 1 according to Embodiment Example 3.

Referring to FIG. 5, the first and second dummy electrodes 141 and 142 in Embodiment Example 3 may be spaced apart from the third surface S3 and the fourth surface S4, respectively, opposing each other in the second direction of the ceramic body 110 by a certain distance.

By being respectively spaced apart from the third surface S3 and the fourth surface S4 opposing each other in the second direction of the ceramic body 110 by a certain distance, no voltage is applied to the first and second dummy electrodes 141 and 142. Consequently, short circuit defect and stray capacitance are less liked to generate, thereby increasing reliability.

Figure 6:
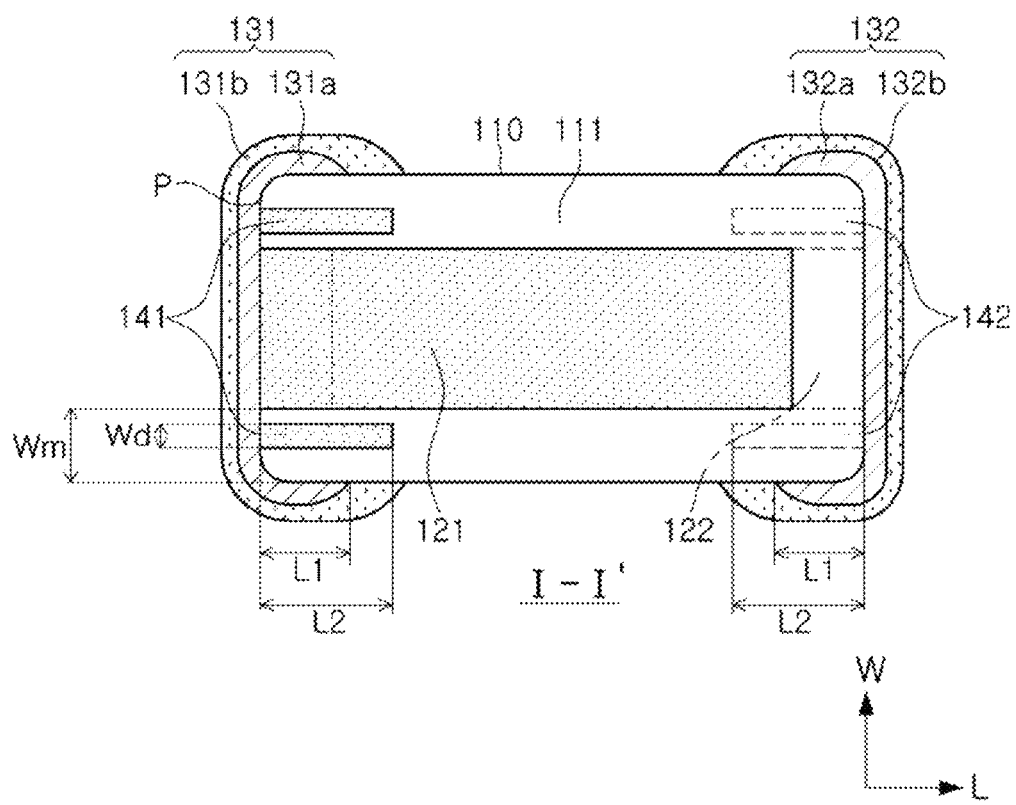
FIG. 6 is a cross-sectional view taken along line I-I' of FIG. 1 according to Embodiment Example 4.

FIG. 6 is a cross-sectional view taken along line I-I' of FIG. 1 according to Embodiment Example 4.

The embodiment of FIG. 6 of the present disclosure includes a multilayer ceramic electronic component, comprising a ceramic body 110 comprising dielectric layers 111 and a plurality of first and second internal electrodes 121 and 122 disposed to face each other with respective dielectric layers 111 interposed therebetween, and a first surface S1 and a second surface S2 opposing each other in a first direction, a third surface S3 and a fourth surface S4 connected to the first and second surfaces and opposing each other in a second direction, and a fifth surface S5 and a sixth surface S6 connected to the first to fourth surfaces and opposing each other in a third direction, and a first external electrode 131 and a second external electrode 132 disposed on external surfaces of the ceramic body 110, where the first and second external electrodes 131 and 132 are electrically connected to the first and second external electrodes 121 and 122, respectively. In the third direction of the ceramic body 110, a first dummy electrode 141 is disposed in a margin portion of the first internal electrode 121 and a second dummy electrode 142 is disposed in a margin portion of the second internal electrode 122. The first and second external electrodes 131 and 132 include a first electrode layer 131a and a second electrode layer 132a, respectively, electrically connected to the first and second internal electrodes 121 and 122, respectively, and a first conductive resin layer 131b and a second conductive resin layer 132b, respectively, disposed on the first and second electrode layers 131a and 132a, respectively, where the first and second electrode layers 131a and 132a and the first and second conductive resin layers 131b and 132b extend to the first and second surfaces of the ceramic body 110. A length (L2) from one end portion of the ceramic body 110 to one end portion of the first and second dummy electrodes 141 and 142 disposed internally within the ceramic body is longer than a length (L1) of the first and second electrode layers 131a and 132a extending to the first and second surfaces.

Hereinbelow, features only according to Embodiment Example 4 will be described referring to FIG. 6, and description of features that are the same as those of the multilayer ceramic electronic component of FIGS. 1-3 will be omitted.

According to Embodiment Example 4, flexural strength of the multilayer ceramic electronic component can be improved by adjusting the length (L2) from one end portion of the ceramic body 110 (e.g., one end portion of the ceramic body 110 at which a first or second dummy electrodes 141 and 142 is exposed) to one end portion of the first and second dummy electrodes 141 or 142 disposed internally within the ceramic body 110 to be longer than the length (L1) of the first and second electrode layers 131a and 132a extending onto the fifth and sixth surfaces of the ceramic body 110.

When the length (L2) from one end portion of the ceramic body 110 (e.g., one end portion of the ceramic body 110 at which a first or second dummy electrodes 141 and 142 is exposed) to one end portion of the first and second dummy electrodes 141 or 142 disposed internally within the ceramic body is shorter than the length (L1) of the first and second electrode layers 131a and 132a extending onto the fifth and sixth surfaces of the ceramic body 110, there will be a defect generated when measuring 5 mm flexural strength, leading to no flexural strength improvement.

Meanwhile, according to another embodiment, an end portion of the first dummy electrode 141, disposed in the ceramic body 110, is disposed between an end portion of a region around which the first electrode layer 131a extends to the fifth and sixth surfaces of the ceramic body 110 and an end of a region around which the first conductive resin layer 131b extends to the fifth and sixth surfaces of the ceramic body 110. An end portion of the second dummy electrode 142, disposed in the ceramic body 110, is disposed between the end portion of the region around which the second electrode layer 132a extends to the fifth and sixth surfaces of the ceramic body 110 and the end of the region around which the second conductive resin layer 132b extends to the fifth and sixth surfaces of the ceramic body 110.

Accordingly, the flexural strength and the moisture-resistance reliability of the multilayer ceramic capacitor can be improved.

Figure 7:
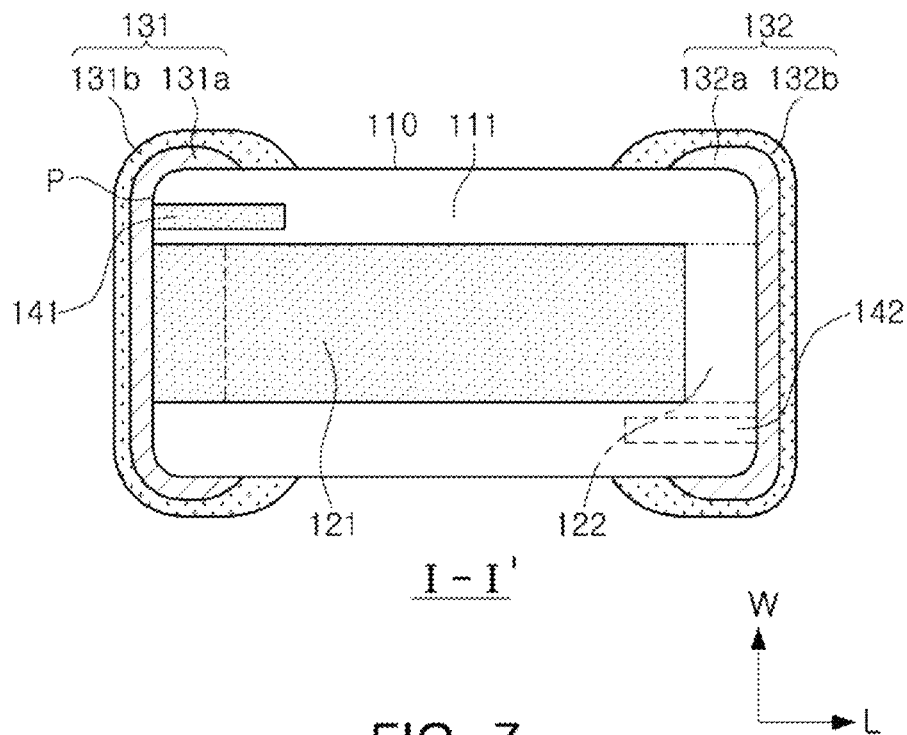
FIG. 7 is a cross-sectional view taken along line I-I' of FIG. 1 according to Embodiment Example 5.

FIG. 7 is a cross-sectional view taken along line I-I' of FIG. 1 according to Embodiment Example 5.

Referring to FIG. 7, the first dummy electrode 141 in Embodiment Example 5 may be disposed in any one region of the margin portion of the first internal electrode 121 in the width direction, and the second dummy electrode 142 may be arranged in any one region of the margin portion of the second internal electrode 122 in the width direction.

When the first and second dummy electrodes 141 and 142 are disposed respectively in any one regions of the margin portions of the first and second internal electrodes 121 and 122 in the width direction, the first and second dummy electrodes 141 and 142 may be disposed diagonally across from each other so as to be on distinct sides of a diagonal bisecting a cross-section in the length-width (LW) direction of the ceramic body 110.

By being disposed diagonally across from each other on opposite sides of the diagonal bisecting the cross-section in the length-width (LW) direction of the ceramic body 110, not only flexural strength is increased but also short defects and stray capacitance are less likely to be generated as the first and second dummy electrodes 141 and 142 can be disposed farthest from each other, thereby increasing the reliability thereof.

Figure 8:
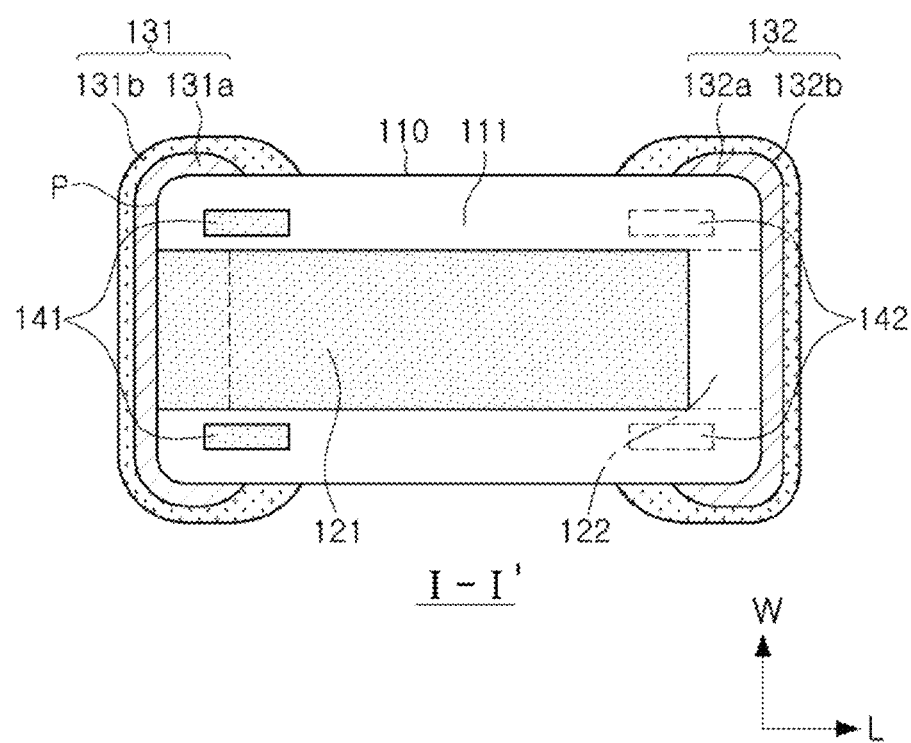
FIG. 8 is a cross-sectional view taken along line I-I' of FIG. 1 according to Embodiment Example 6.

FIG. 8 is a cross-sectional view taken along line I-I' of FIG. 1 according to Embodiment Example 6.

Referring to FIG. 8, the first and second dummy electrodes 141 and 142 in Embodiment Example 6 may be spaced apart respectively from the third surface S3 and the fourth surface S4 opposing each other in the second direction of the ceramic body 110 by a certain distance.

By being spaced apart respectively from the third surface S3 and the fourth surface S4 opposing each other in the second direction of the ceramic body 110 by a certain distance, no voltage is applied to the first and second dummy electrodes 141 and 142. Consequently, short defect and stray capacitance are less likely to be generated, thereby increasing reliability.

Figure 9:
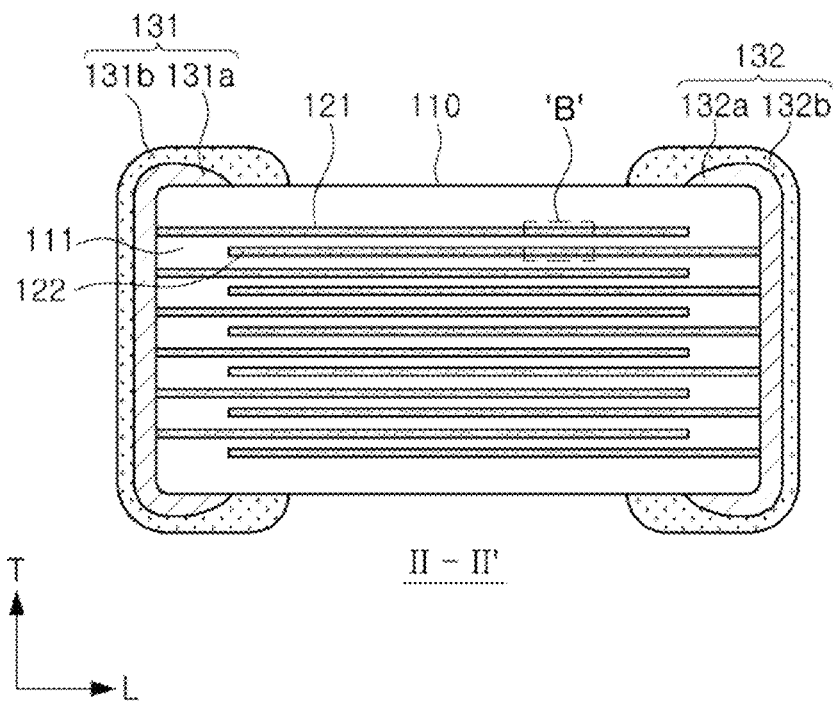
FIG. 9 is a cross-sectional view taken along line II-II' of FIG. 1.

FIG. 9 is a cross-sectional view taken along line II-IP of FIG. 1.

Figure 10:
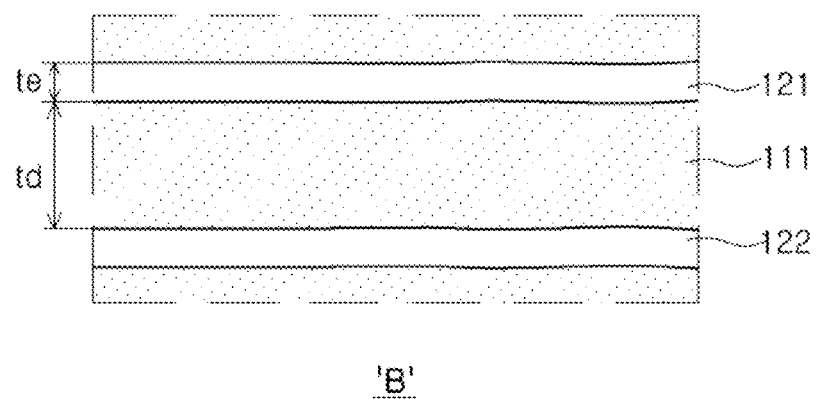
FIG. 10 is an enlarged view of region 'B' of FIG. 9.

FIG. 10 is an enlarged view of B of FIG. 9.

Referring to FIGS. 9 and 10, a thickness (td) of the dielectric layer 111 and thicknesses (te) of the first and/or second internal electrodes 121 and 122, in terms of the multilayer ceramic electronic component according to an embodiment, satisfy td>2×te.

That is, according to an embodiment, the thickness (td) of the dielectric layer 111 is twice as large as the thicknesses (te) of each of the internal electrodes 121 and 122.

Generally, high voltage electric field electronic components have a reliability issue due to a decrease in breakdown voltage under a high voltage environment.

In order to prevent a decrease in breakdown voltage under a high voltage environment, the multilayer ceramic electronic component according to an embodiment includes the dielectric layers 111 that are more than twice as thick as the internal electrodes 121 and 122, thereby increasing the thickness (td) of the dielectric layer, which corresponds to a distance between internal electrodes, and thus increasing breakdown voltage properties.

When the thickness (td) of the dielectric layers 111 are twice or less as thick as the thicknesses (te) of the internal electrodes 121 and 122, the thickness of the dielectric layer is too small, thereby giving rise to decreased breakdown voltage.

The thicknesses (te) of the internal electrodes may be less than 1 μm but is not limited thereto.

Hereinbelow, a method for preparing the multilayer ceramic electronic component according to an embodiment will be described, but the present disclosure is not limited thereto.

The method for preparing the multilayer ceramic electronic component involves formation of a dielectric layer by applying slurry formed to include powder of barium titanate (BaTiO$_3$) or the like on a carrier film and drying the same to prepare a plurality of ceramic green sheets.

By preparing slurry by mixing ceramic powder, a binder and a solvent, the ceramic green sheets may be prepared in the form of a sheet having a several micrometer-thickness using a doctor blade method.

A conductive paste for forming internal electrodes can be prepared to include parts by weight to 50 parts by weight of nickel powder whose nickel particles have an average particle size of 0.1 μm to 0.2 μm.

The ceramic body 110 was prepared by applying the conductive paste for forming internal electrodes on the green sheet using a screen printing method to form the internal electrodes and forming a conductive paste for dummy electrodes in a width direction-margin portion followed by stacking green sheets in which internal electrode patterns and dummy patterns are disposed.

An electrode layer may be prepared on an external surface of the ceramic body and formed of at least one conductive metal selected from the group consisting of copper (Cu), silver (Ag), nickel (Ni) and alloys thereof and a glass.

The glass is not particularly limited, and a substance having the same composition as a glass used in the preparation of an external electrode of a conventional multilayer ceramic capacitor can be used.

The first electrode layers are each formed on upper and lower surfaces and a respective end portion of the ceramic body, and thus can be electrically connected to the first and second internal electrodes, respectively.

The electrode layer may include a glass more than 5% by volume over a conductive metal.

The conductive resin layers 131b and 132b can be prepared by applying a conductive resin composition to the electrode layers 131a and 132a and hardening.

The conductive resin layers 131b and 132b include at least one conductive metal selected from the group consisting of Cu, Ag, Ni and alloys thereof and a base resin, where the base resin may be an epoxy resin.

Frequencies of warpage cracks according to ratios Wd/Wm of the widths (Wd) of the first and second dummy electrodes 141 and 142 over the widths (Wm) of the margin portions of the first and second internal electrodes 121 and 122 and shown in Table 1 below.

For the measurement of the frequencies of warpage cracks, distances from a center portion pressured when bending were set to 3 mm, 4 mm, 5 mm, 6 mm and 7 mm after mounting samples of the multilayer capacitor on a substrate. Sixty (60) multilayer ceramic electronic components of each sample type (e.g., each sample type having a different ratio Wd/Wm, as reported in Table 1) were measured and observed as to whether flexural strength is secured at a distance of 5 mm or farther.

TABLE 1

| Sample type | Wd/Wm | 3 mm | 4 mm | 5 mm | 6 mm | 7 mm |
|---|---|---|---|---|---|---|
| 1 | 60% | 0/60 | 0/60 | 0/60 | 0/60 | 0/60 |
| 2 | 50% | 0/60 | 0/60 | 0/60 | 0/60 | 0/60 |
| 3 | 40% | 0/60 | 0/60 | 0/60 | 0/60 | 0/60 |
| 4 | 30% | 0/60 | 0/60 | 0/60 | 0/60 | 0/60 |
| 5 | 20% | 0/60 | 0/60 | 0/60 | 1/60 | 1/60 |
| *6 | 10% | 0/60 | 0/60 | 1/60 | 1/60 | 3/60 |
| *7 | 0% (no dummy electrode) | 0/60 | 3/60 | 4/60 | 4/60 | 7/60 |

*Comparative Example

It can be understood based on Table 1 that the flexural strength of the multilayer ceramic capacitor is increased by adjusting the widths (Wd) of the first and second dummy electrodes 141 and 142 to satisfy 20% to 60% of the widths (Wm) of the margin portions of the first and second internal electrodes 121 and 122 taken in the third direction of the ceramic body 110.

That is, the flexural strength of sample types Nos. 1 to 5, which are the Embodiment Examples of the present disclosure, is secured at a distance of 5 mm or less.

In contrast, defects were found in sample type No. 6, in which a ratio of the widths (Wd) of the first and second dummy electrodes 141 and 142 over the widths (Wm) of the margin portions of the first and second internal electrodes 121 and 122 taken in the third direction of the ceramic body 110 is 10%, and sample type No. 7, a conventional case in which no dummy electrode is arranged, in flexural strength experiments, indicating that there is an issue with flexural properties.

Frequencies of warpage cracks according to the lengths (L2) of the first and second dummy electrodes 141 and 142 disposed internally within the ceramic body 110 from an end portion thereof are measured and shown in Table 2 below.

For the measurement of the frequencies of warpage cracks, distances from a center portion pressured when bending were set to 3 mm, 4 mm, 5 mm, 6 mm and 7 mm after mounting samples of the multilayer capacitor on a substrate. Sixty (60) multilayer ceramic electronic components of each sample type (e.g., each sample type having a different length L2, as reported in Table 2) were measured and observed as to whether flexural strength is secured at a distance of 5 mm or farther.

Samples Nos. 8 and 9, which are Comparative Examples, are cases in which lengths (L2) from end portions of the ceramic body 110 to the first and second dummy electrodes 141 and 142 disposed internally within the ceramic body are respectively shorter than those (L1) of regions in which the first and second electrode layers 131a and 132b extend to the first surface and the second surface of the ceramic body 110.

In particular, sample type No. 8 is a case in which L2 is 50% of L1, and sample type No. 9 is a case in which L2 is 80% of L1.

Sample types No. 10 and 11, which are Embodiment Examples, are cases in which lengths (L2) from end portions of the ceramic body 110 to the first and second dummy electrodes 141 and 142 disposed internally within the ceramic body are respectively longer than those (L1) of regions in which the first and second electrode layers 131a and 132b extend to the first surface and the second surface of the ceramic body 110.

In particular, sample type No. 10 is a case in which L2 is 110% of L1, and sample type No. 11 is a case in which L2 is 150% of L1.

TABLE 2

| Sample | 3 mm | 4 mm | 5 mm | 6 mm | 7 mm |
|---|---|---|---|---|---|
| *8 | 0/60 | 1/60 | 2/60 | 2/60 | 0/60 |
| *9 | 0/60 | 1/60 | 1/60 | 1/60 | 0/60 |
| 10 | 0/60 | 0/60 | 0/60 | 0/60 | 0/60 |
| 11 | 0/60 | 0/60 | 0/60 | 0/60 | 0/60 |

*Comparative Example

It can be understood based on Table 2 that the flexural strength is secured for sample types Nos. 10 and 11, which are cases in which lengths (L2) from end portions of the ceramic body 110 to the first and second dummy electrodes 141 and 142 disposed internally within the ceramic body are respectively longer than those (L1) of regions in which the first and second electrode layers 131a and 132b extend to the first surface and the second surface of the ceramic body 110, at a distance of 5 mm or greater.

In contrast, defects were found in sample types Nos. 8 and 9, in which lengths (L2) from end portions of the ceramic body 110 to the first and second dummy electrodes 141 and 142 disposed internally within the ceramic body are respectively shorter than those (L1) of regions in which the first and second electrode layers 131a and 132b extend to the first surface and the second surface of the ceramic body 110, indicating that there is an issue with flexural properties.

While exemplary embodiments have been shown and described herein, it will be apparent to those skilled in the art that modifications and variations can be made without departing from the spirit and scope of the invention as defined by the appended claims.

According to an embodiment of the present disclosure, flexural strength can be enhanced by controlling a ratio Wd/Wm of the widths (Wd) of dummy electrodes over the widths (Wm) of the margin portions of the internal electrodes to be within the range of 20% to 60%.

While embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
a ceramic body comprising a plurality of first internal electrodes and a plurality of second internal electrodes alternately disposed to face each other with respective dielectric layers interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; and
a first external electrode and a second external electrode disposed on external surfaces of the ceramic body, the first and second external electrodes being electrically connected to the first and second internal electrodes respectively,
wherein a first dummy electrode is disposed in a margin portion of the ceramic body adjacent the first internal electrode in the third direction, and a second dummy electrode is disposed in a margin portion of the ceramic body adjacent the second internal electrode in the third direction, and
wherein, in the third direction of the ceramic body, widths of the first and second dummy electrodes satisfy 20% to 60% of widths of the margin portions of the first and second internal electrodes in the third direction.

2. The multilayer ceramic electronic component of claim 1, wherein, in the third direction of the ceramic body, widths of the first and second dummy electrodes satisfy 30% to 60% of widths of the margin portions of the first and second internal electrodes in the third direction.

3. The multilayer ceramic electronic component of claim 1, wherein the ceramic body has rounded corners each having an inflection point between a straight portion of a ceramic body surface and the rounded corner, and the first and second dummy electrodes are disposed between an inflection point and a center of the ceramic body along the third direction.

4. The multilayer ceramic electronic component of claim 1, wherein the first dummy electrode is disposed in only one margin portion of the first internal electrode, and the second dummy electrode is disposed in only one margin portion of the second internal electrode.

5. The multilayer ceramic electronic component of claim 1, wherein the first and second dummy electrodes are spaced apart by a certain distance respectively from the third and fourth surfaces disposed opposite each other in the second direction of the ceramic body.

6. The multilayer ceramic electronic component of claim 1, wherein the first and second dummy electrodes are disposed on different dielectric layers.

7. The multilayer ceramic electronic component of claim 1, wherein the first and second internal electrodes have a thickness (te) of less than 1 μm and the dielectric layer has a thickness (td) of less than 2.8 μm.

8. The multilayer ceramic electronic component of claim 1, wherein the dielectric layer has a thickness (td) and the first and second internal electrodes have a thickness (te) that satisfy td>2×te.

9. The multilayer ceramic electronic component of claim 1,
wherein the first dummy electrode is disposed in the margin portion of a first layer of the ceramic body adjacent the first internal electrode in the third direction, and the second dummy electrode is disposed in the margin portion of a second layer of the ceramic body adjacent the second internal electrode in the third direction, and
wherein at least one of the first layer or the second layer is devoid of a dummy electrode which overlaps the second dummy electrode or the first dummy electrode, respectively, in the first direction.

10. The multilayer ceramic electronic component of claim 1,
- wherein the first and second external electrodes respectively comprise a first electrode layer and a second electrode layer respectively electrically connected to the first and second internal electrodes, and further comprise a first conductive resin layer and a second conductive resin layer respectively disposed on the first and second electrode layers, the first and second electrode layers and the first and second conductive resin layers extending to the fifth and sixth surfaces of the ceramic body,
- wherein one end portion of the first dummy electrode in the second direction is disposed in the ceramic body between one end portion of a region around which the first electrode layer is disposed to extend to the fifth and sixth surfaces of the ceramic body, and one end portion of a region around which the first conductive resin layer is disposed to extend to the fifth and sixth surfaces of the ceramic body, and
- one end portion of the second dummy electrode in the second direction is disposed in the ceramic body between one end portion of a region around which the second electrode layer is disposed to extend to the fifth and sixth surfaces of the ceramic body, and one end portion of a region around which the second conductive resin layer is disposed to extend to the fifth and sixth surfaces of the ceramic body.

11. The multilayer ceramic electronic component of claim 9,
- wherein the first and second external electrodes respectively comprise a first electrode layer and a second electrode layer respectively electrically connected to the first and second internal electrodes, and
- wherein a length (L2) in the second direction of the first and second dummy electrodes disposed internally within the ceramic body is longer than a length (L1) of the first and second electrode layers extending onto the fifth and sixth surfaces in the second direction.

12. The multilayer ceramic electronic component of claim 9,
- wherein the first and second external electrodes respectively comprise a first electrode layer and a second electrode layer respectively electrically connected to the first and second internal electrodes, and
- wherein a length (L2) in the second direction of the first and second dummy electrodes disposed internally within the ceramic body is satisfy 110% or more of a length (L1) of the first and second electrode layers extending onto the fifth and sixth surfaces in the second direction.

\* \* \* \* \*